US006791651B2

United States Patent
Jo et al.

(10) Patent No.: US 6,791,651 B2
(45) Date of Patent: Sep. 14, 2004

(54) ARRAY SUBSTRATE FOR IPS MODE LIQUID CRYSTAL DISPLAY DEVICE AND FABRICATING METHOD FOR THE SAME

(75) Inventors: Gyoo-Chul Jo, Gyeonggi-do (KR); Gee-Sung Chae, Incheon (KR)

(73) Assignee: LG. Philips LCD Co., Ltd., Seoul (KR)

(*) Notice: Subject to any disclaimer, the term of this patent is extended or adjusted under 35 U.S.C. 154(b) by 156 days.

(21) Appl. No.: 10/293,266

(22) Filed: Nov. 14, 2002

(65) Prior Publication Data

US 2003/0123009 A1 Jul. 3, 2003

(30) Foreign Application Priority Data

Dec. 28, 2001 (KR) .............................. 10-2001-0087619

(51) Int. Cl.[7] .......................................... G02F 1/1343
(52) U.S. Cl. ........................................ 349/141; 349/38
(58) Field of Search ........................... 349/38, 39, 139, 349/141, 147

(56) References Cited

U.S. PATENT DOCUMENTS

| | | | | |
|---|---|---|---|---|
| 5,598,285 A | | 1/1997 | Kondo et al. ................. | 349/39 |
| 5,745,207 A | | 4/1998 | Asada et al. ................. | 349/141 |
| 5,838,037 A | | 11/1998 | Masutani et al. ........... | 257/296 |
| 5,946,060 A | | 8/1999 | Nishiki et al. ................ | 349/48 |
| 5,990,987 A | | 11/1999 | Tanaka ......................... | 349/43 |
| 6,028,653 A | * | 2/2000 | Nishida ....................... | 349/141 |
| 6,097,454 A | | 8/2000 | Zhang et al. ................. | 349/43 |
| 6,292,237 B1 | * | 9/2001 | Hebiguchi ................... | 349/39 |
| 6,297,867 B1 | * | 10/2001 | Miyahara et al. ........... | 349/141 |
| 6,707,523 B2 | * | 3/2004 | Oota et al. ................... | 349/141 |

FOREIGN PATENT DOCUMENTS

| | | | | |
|---|---|---|---|---|
| JP | | 9-5764 | 1/1997 | |
| JP | | 9-73101 | 3/1997 | |
| JP | | 9-101538 | 4/1997 | |
| JP | | 9-105908 | 4/1997 | |
| JP | | 2001183699 A | * 7/2001 | ......... G02F/1/1365 |

OTHER PUBLICATIONS

"Principles and Characteristics of Electro–Optical Behaviour with In–Plane Switching Mode", M. Oh–e, et al., Asia Display '95, pp. 577–580.

"Advanced 18.1–inch Diagonal Super–TFT–LCDs with Mega Wide Viewing Angle and Fast Response Speed of 20ms", S. Endoh, et al., AMD4–1, IDW'99, pp. 187–190.

"S30–2 Development of Super–TFT–LCDs with In–Plane Switching Display Mode", M. Ohta, et al., Asia Display /95, pp. 707–710.

"38.1: An Advanced In–Plane Switching Mode TFT–LCD", H. Wakemoto, et al., SID 97 Digest, pp. 929–932.

(List continued on next page.)

*Primary Examiner*—Robert H. Kim
*Assistant Examiner*—David Chung
(74) *Attorney, Agent, or Firm*—Morgan Lewis & Bockius LLP

(57) ABSTRACT

An array substrate for an in-plane switching (IPS) mode liquid crystal display (LCD) device including a substrate, a plurality of gate lines disposed along a first direction on the substrate, a plurality of data lines disposed along a second direction perpendicular to the first direction on the substrate to define a plurality of pixel regions, a pixel electrode and a common electrode on the substrate, the pixel electrode including an extension portion, a plurality of vertical portions, and a horizontal portion, and a transparent electrode contacting the horizontal portion of the pixel electrode and extending over one of the gate lines, wherein the data line includes aluminum dual layer structure having a first metal layer and a second metal layer.

38 Claims, 15 Drawing Sheets

OTHER PUBLICATIONS

"P2–30 In–Plane Switching of Nematic Liquid Crystals", R. Kiefer, et al.,Japan Display '92, pp 547–550.

"LP–A: Display Characteristics of In–Plane–Switching (IPS) LCDs and a Wide–Viewing–Angle 14.5–in. IPS TFT–LCD", S. Matsumoto, et al., Euro Display '96, pp. 445–448.

"High–Transmittance, Wide–Viewing–Angle Nematic Liquid Crystal Display Controlled by Fringe–Field Switching", S. H. Lee, et al., Asia Display '98, pp 371–374.

* cited by examiner

ARRAY SUBSTRATE FOR IPS MODE LIQUID CRYSTAL DISPLAY DEVICE AND FABRICATING METHOD FOR THE SAME

The present invention claims the benefit of Korean Patent Application No. 2001-87619, filed in Korea on Dec. 28, 2001, which is hereby incorporated by reference.

BACKGROUND OF THE INVENTION

1. Field of the Invention

The present invention relates to a liquid crystal display (LCD) device, and more particularly, to an array substrate for an In-Plane Switching (IPS) mode liquid crystal display device and fabricating method for the same.

2. Discussion of the Related Art

Liquid crystal display (LCD) devices commonly make use of optical anisotropy and polarization properties of liquid crystal molecules to produce image data. The liquid crystal molecules have a definite alignment direction resulting from their thin and long shapes. The alignment direction of the liquid crystal molecules can be controlled by application of an electric field. Accordingly, as the alignment direction of the applied electric field is changed, the alignment of the liquid crystal molecules also changes. Because incident light is refracted by the orientation of the liquid crystal molecules due to their optical anisotropy, image data is displayed. Active matrix liquid crystal display (LCD) devices, in which the thin film transistors and the pixel electrodes are arranged in the form of a matrix, are commonly used because of their high resolution and superiority in displaying moving images. An array substrate for an in-plane switching (IPS) mode liquid crystal display (LCD) device and a fabrication method for the same will be described hereinafter with reference to figures attached.

FIG. 1 is a plan view of a pixel of an array substrate for a related art in-plane switching (IPS) mode liquid crystal display (LCD) device. In FIG. 1, the array substrate for the in-plane switching (IPS) mode liquid crystal display (LCD) device has a plurality of gate lines 12, common lines 16 and data lines 24, wherein the gate line 12 and the common line 16 are formed along a horizontal direction and the data line 24 crosses the gate line 12 and the common line 16, thereby defining a pixel region "P" by crossing the data line 24. A gate pad electrode 13 is formed at one end of the gate line 12, and a data pad electrode 25 is formed at one end of the data line 24. A thin film transistor "T" is formed at a cross point of the gate and data lines 12 and 24. The thin film transistor "T" includes a gate electrode 14, an active layer 20, a source electrode 26, and a drain electrode 28. The gate electrode 14 extends from the gate line 12, and the source electrode 26 is electrically connected to the data line 24. A pixel electrode 30 and a common electrode 17 are formed within the pixel region "P," wherein the pixel electrode 30 is electrically connected to the drain electrode 28. The common electrode 17 is formed parallel with the pixel electrode 30 and is electrically connected to the common line 16. The pixel electrode 30 includes an extension portion 30a, a plurality of vertical portions 30b, and a horizontal portion 30c. The extension portion 30a extends from the drain electrode 28, the vertical portion 30b vertically extends from the extension portion 30a, and the extension and vertical portions 30a and 30b are spaced apart from each other. The horizontal portion 30c is disposed over the common line 16, and electrically interconnects the plurality of vertical portions 30b. The common electrode 17 has a plurality of vertical portions 17b and a horizontal portion 17a. The vertical portions 17b vertically extend from the common line 16 and are arranged in an alternating pattern with the vertical portion 30b of the pixel electrode 30. The horizontal portion 17a electrically interconnects the plurality of vertical portions 17b. The vertical portion 17b is spaced apart from the data line 24. A storage capacitor "C" is formed within the pixel region "P," and uses a portion of the common line 16 as a first storage electrode and a horizontal portion 30c of the pixel electrode 30 as a second electrode. The gate pad electrode 13 electrically contacts a gate pad terminal electrode 30 through a gate pad contact hole 33. The data pad electrode 25 electrically contacts a data pad terminal electrode 41 through a data pad contact hole 35. The source electrode 25, the drain electrode 28, and the data line 24 are formed to have a single layer using one of molybdenum (Mo) or chromium (Cr). However, metals such as molybdenum (Mo) or chromium (Cr), which are used for the source and drain electrode 26 and 28, have a high electric resistance and are not suitable for large-sized liquid crystal display panels.

FIGS. 2A to 2D are cross-sectional views taken along II—II, III—III, IV—IV and V—V of FIG. 1 and illustrate a fabrication sequence of an array substrate according to the related art. In FIG. 2A, the gate line 12, the gate pad electrode 13, and the common line 16 are formed on the substrate 10 by depositing and patterning a conductive metal material, such as aluminum (Al) and an aluminum alloy. The gate electrode 14 is a part of the gate line 12, and the common line 16 is spaced apart from the gate line 12. The plurality of vertical portions 17b of the common electrode 17 vertically extend from the common line 16, and the horizontal portion 17a (not shown) of the common electrode 17 electrically interconnects the plurality of vertical portions 17b. The gate electrode 14, the gate line 12, and the gate pad electrode 13 have a dual-layer structure. The dual-layer structure of the gate line 12 and the gate electrode 14 includes aluminum (Al). For example, aluminum (Al) is used for a first metal layer and molybdenum (Mo) or chromium (Cr) is used for a second metal layer. Then, a gate insulating layer 18 is formed on the substrate 10 using silicon nitride (SiNx). A first pattern 20, a second pattern 21, and a third pattern 22 are formed by simultaneously depositing and patterning amorphous silicon (a-Si:H) and impurities doped amorphous silicon ($n^+$a-Si:H) on the gate insulating layer 18. The first pattern 20 is disposed within an active region "A" over the gate electrode 14, the second pattern 21 over the common line 16 and the third pattern within a data pad region "D." The second pattern 21 and the third pattern 22 improve a contact property of a metal layer that will be formed thereon in a later process. An amorphous silicon (a-Si:H) layer of the first pattern 20 is commonly referred to as an active layer 20a, and an impurities doped amorphous silicon ($n^+$a-Si:H or $p^+$a-Si:H) of the first pattern 20 is commonly referred to as an ohmic contact layer 20b.

In FIG. 2B, the data line 24, the source electrode 26, the drain electrode 28, and the pixel electrode 30b and 30c are formed by depositing and patterning one of chromium (Cr) and molybdenum (Mo) on the substrate 10. The data line 24 defines the pixel region "P" by crossing the gate line 12. The source electrode 26 extends from the data line 24 and electrically contacts the ohmic contact layer 20b, and the drain electrode 28 is spaced apart from the source electrode 26. The pixel electrode 30 includes the extension portion 30a (not shown), the plurality of vertical portions 30b, and the horizontal portion 30c. The data pad electrode 25 is formed at one end of the data line 24.

In FIG. 2C, a passivation layer 32 is formed by depositing silicon nitride (SiNx) on the substrate 10. A gate pad contact hole 33 is formed to expose a portion of the gate pad electrode 13, and a data pad contact hole 35 is formed to expose a portion of the data pad electrode 25 by patterning the passivation layer 32.

In FIG. 2D, both the gate pad terminal electrode 39 is formed with the gate pad electrode 13 and the data pad terminal electrode 41 is formed with the data pad electrode 25 by depositing and patterning transparent conductive metal material, such as indium tin oxide (ITO) on the substrate 10. The storage capacitor "C" is formed between the common line 16 and the horizontal portion 30c of the pixel electrode 30. The storage capacitor "C" uses the portion of the common line 16 as the first storage electrode and the horizontal portion 30c of the pixel electrode 30 as the second storage electrode. The gate insulating layer 18 and the second pattern 21 are disposed between the common line 16 and the horizontal portion 30c of the pixel electrode 30.

SUMMARY OF THE INVENTION

Accordingly, the present invention is directed to an array substrate for in-plane switching (IPS) mode liquid crystal display (LCD) device and fabrication method for the same that substantially obviates one or more of problems due to limitations and disadvantages of the related art.

An object of the present invention is to provide an array substrate for an in-plane switching (IPS) mode liquid crystal display (LCD) device in which a metal layer of a source electrode, a drain electrode, and a data line has a dual-layer structure for manufacturing a large size liquid crystal display panel.

Another object of the present invention is to provide a fabrication method of an array substrate for an in-plane switching (IPS) mode liquid crystal display (LCD) device in which a metal layer of a source electrode, a drain electrode, and a data line has a dual-layer structure for manufacturing a large size liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for an in-plane switching (IPS) mode liquid crystal display (LCD) device including a substrate, a plurality of gate lines disposed along a first direction on the substrate, a plurality of data lines disposed along a second direction perpendicular to the first direction on the substrate to define a plurality of pixel regions, a pixel electrode and a common electrode on the substrate, the pixel electrode including an extension portion, a plurality of vertical portions, and a horizontal portion, and a transparent electrode contacting the horizontal portion of the pixel electrode and extending over one of the gate lines, wherein the data line includes aluminum dual layer structure having a first metal layer and a second metal layer.

In another aspect, an array substrate for an in-plane switching (IPS) mode liquid crystal display (LCD) device includes a substrate, a plurality of gate lines, a plurality of common lines, and a gate pad electrode on the substrate, the gate pad electrode extending from the gate lines, a plurality of data lines and a data pad electrode extending from the data lines, source and drain electrodes on the substrate, a pixel electrode and a common electrode on the substrate, the pixel electrode including an extension portion, a plurality of vertical portions, and a horizontal portion, and a transparent electrode, a gate pad terminal electrode, and a data pad terminal electrode, the transparent electrode contacting the pixel electrode and extending over the gate line, the gate pad terminal electrode contacting the gate pad electrode, and the data pad terminal electrode contacting the data pad electrode, wherein the data lines, the data pad, and the source and drain electrodes include an aluminum dual-layer structure having a first metal layer and a second metal layer.

In another aspect, a method for fabricating an array substrate for an in-plane switching (IPS) mode liquid crystal display (LCD) device includes forming a plurality of gate lines on a substrate, forming a plurality of data lines crossing the gate lines, the data lines including an aluminum dual-layer structure having a first metal layer and a second metal layer, forming a pixel electrode and a common electrode on the substrate, the pixel electrode having an extension portion, a plurality of vertical portions, and a horizontal portion, and forming a transparent electrode contacting the horizontal portion of the pixel electrode and extending over the gate lines.

In another aspect, a method for fabricating an array substrate for an in-plane switching (IPS) mode liquid crystal display (LCD) device includes forming a plurality of gate lines, a plurality of common lines, and a gate pad electrode on a substrate, the gate pad electrode extending from the gate lines, forming a plurality of data lines and a data pad electrode, the data lines and the data pad electrode including an aluminum dual-layer structure having a first metal layer and a second metal layer, the data pad electrode extending from the data line, forming a pixel electrode and a common electrode on the substrate, the pixel electrode having an extension portion, a plurality of vertical portions, and a horizontal portion, and forming a transparent electrode, a gate pad terminal electrode, and a data pad terminal electrode, wherein the transparent electrode contacts the horizontal portion of the pixel electrode and extends over the gate lines, the gate pad terminal electrode contacts the gate pad electrode, and the data pad terminal electrode contacts the data pad electrode.

In another aspect, a method for fabricating an array substrate for an in-plane switching (IPS) mode liquid crystal display (LCD) device includes forming a plurality of gate lines, a plurality of common lines, and a gate pad electrode on a substrate, the gate pad electrode extending from the gate lines, forming a plurality of data lines and a data pad electrode on the substrate, the data lines and the data pad electrode including an aluminum dual-layer structure having a first metal layer and a second metal layer, and the data pad electrode extending from the data line, forming source and drain electrodes on the substrate, the source and drain electrodes including an aluminum dual-layer structure having a first metal layer and a second metal layer, forming a pixel electrode and a common electrode on the substrate, the pixel electrode having an extension portion, a plurality of vertical portions, and a horizontal portion, and forming a transparent electrode, a gate pad terminal electrode, and a data pad terminal electrode, wherein the transparent electrode contacts the horizontal portion of the pixel electrode and extends over the gate lines, the gate pad terminal electrode contacts the gate pad electrode, and the data pad terminal electrode contacts the data pad electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
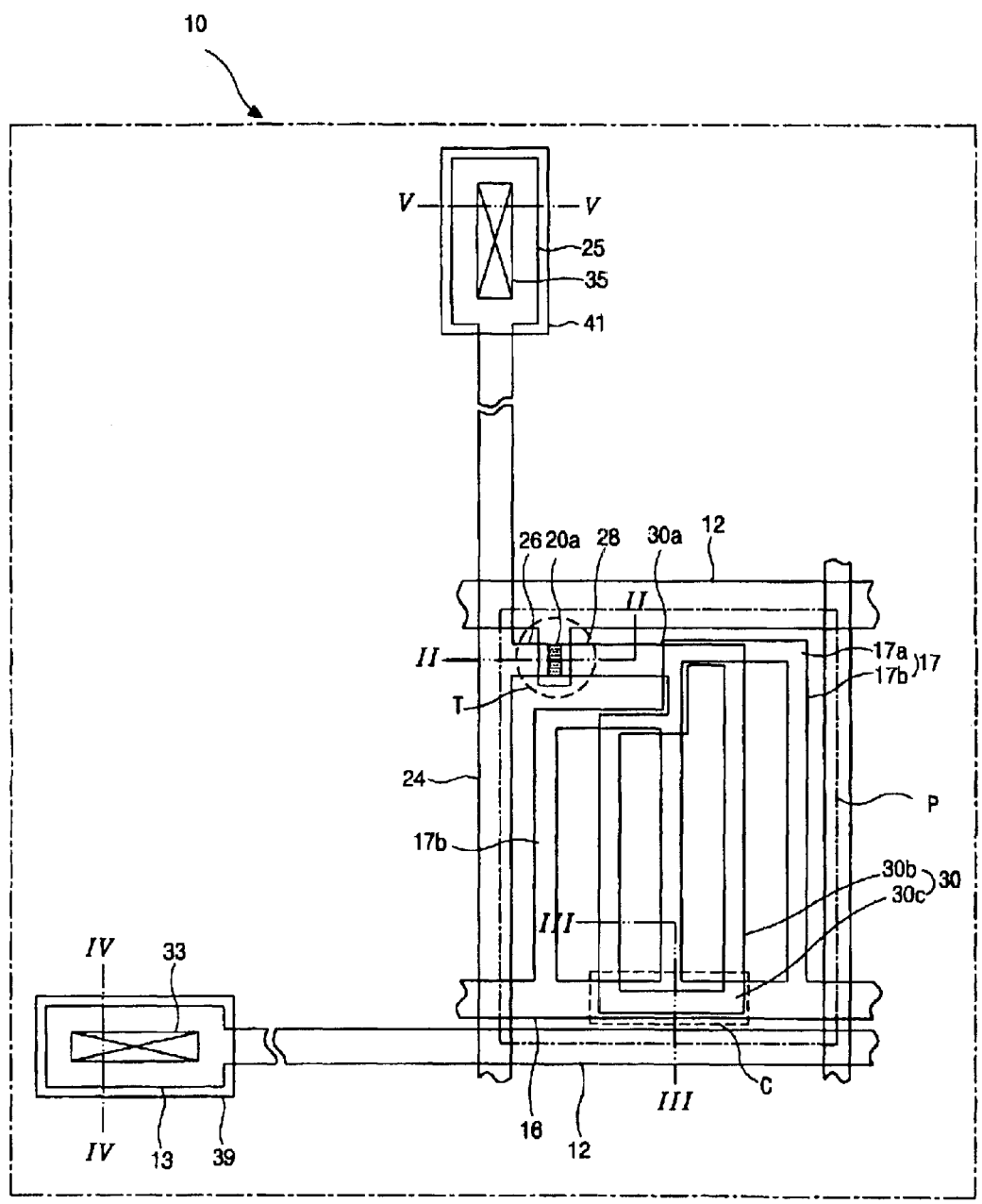
FIG. 1 is a plan view of a pixel of an array substrate for a related art in-plane switching (IPS) mode liquid crystal display (LCD) device.
Figure 2A:
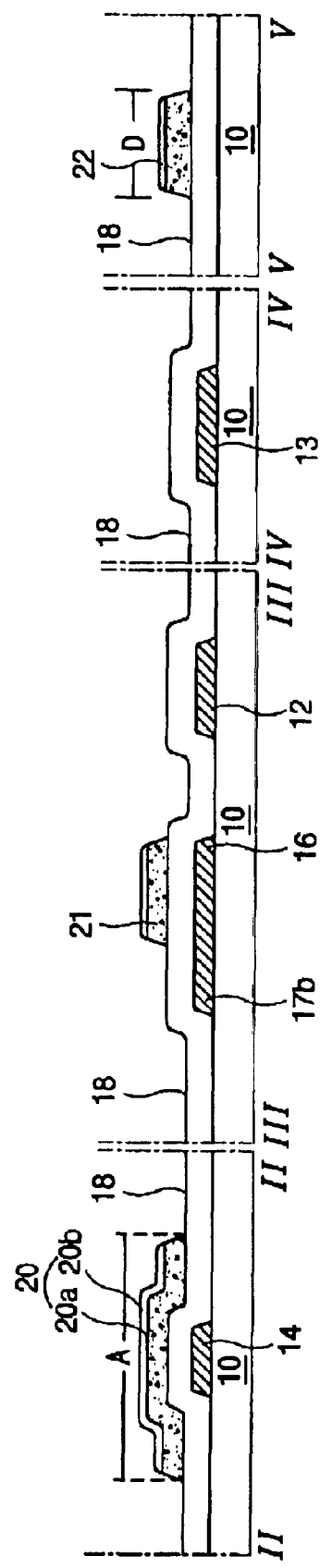
FIGS. 2A to 2D are cross-sectional views taken along II—II, III—III, IV—IV and V—V of FIG. 1 and illustrate a fabrication sequence of an array substrate according to the related art.
Figure 2B:
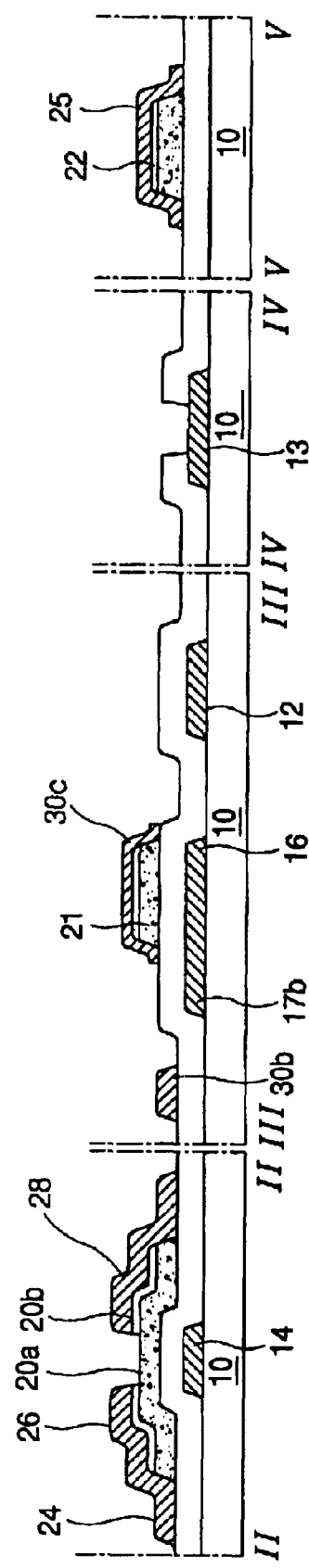
Figure 2C:
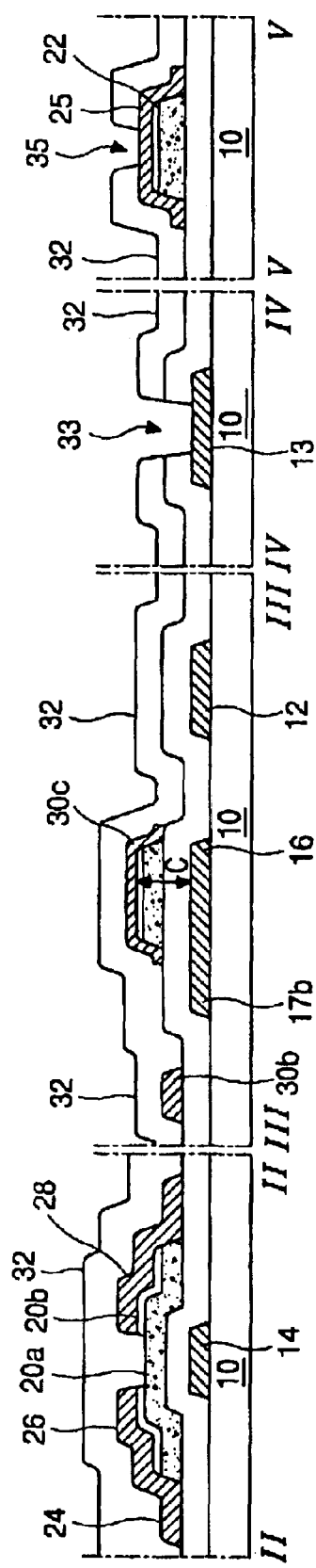
Figure 2D:
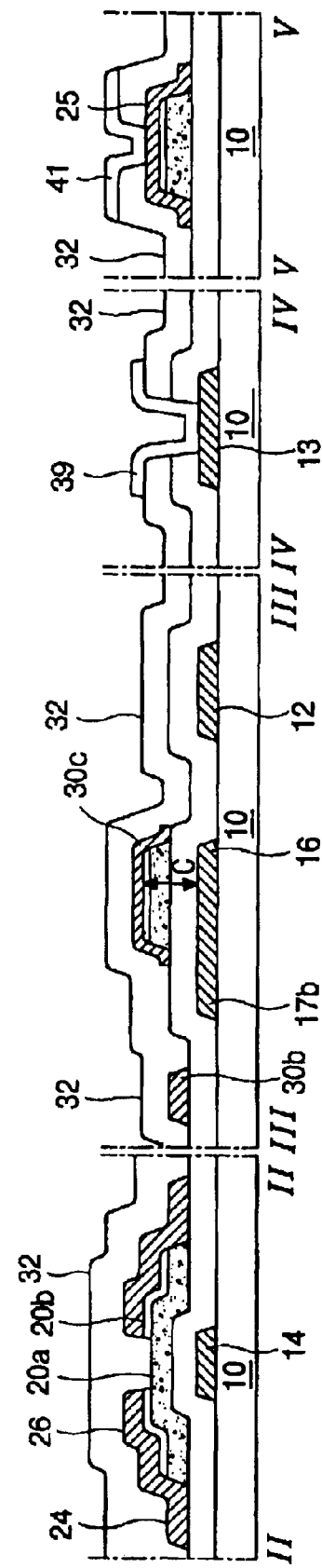
Figure 3:
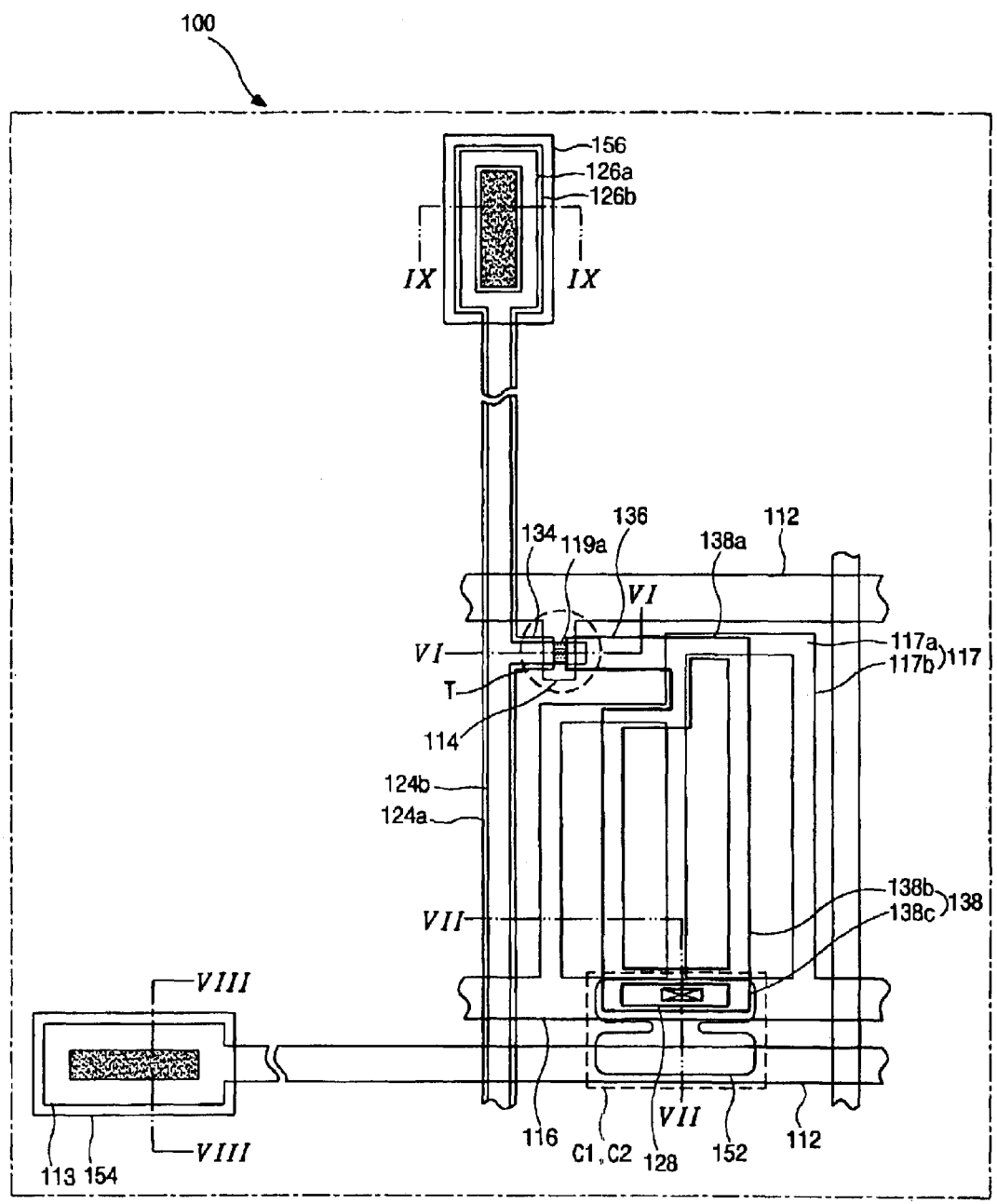
FIG. 3 is a plan view of a pixel of an exemplary array substrate for an in-plane switching (IPS) mode liquid crystal display (LCD) device according to the present invention.

FIG. 3 is a plan view of a pixel of an exemplary array substrate for an in-plane switching (IPS) mode liquid crystal display (LCD) device according to the present invention. In FIG. 3, a plurality of gate lines 112, common lines 116, and data lines 124a and 124b may be formed on a substrate 100. The gate line 112 and the common line 116 may be formed along a horizontal direction, and may be parallel to each other. The data lines 124a and 124b may cross the gate line 112 and the common line 116, thereby defining a pixel region by crossing the gate line 112. A gate pad electrode 113 may be formed at one end of the gate line 112, and a data pad electrode 126a and 126b may be formed at one end of the data lines 124a and 124b. A thin film transistor "T" may be formed at a cross point of the gate line 112 and the data line 124. The thin film transistor "T" may include a gate electrode 114, an active layer 119a, a source electrode 134, and a drain electrode 136. The gate line 114 may extend from the gate line 112, and the active layer 119 may be formed over the gate electrode 114. The source electrode 134 may be electrically connected to the data line 124b.

A pixel electrode 138 and a common electrode 117 may be formed within the pixel region, wherein the pixel electrode 138 may be electrically connected to the drain electrode 136 and the common electrode 117 may be parallel to the pixel electrode 138 and electrically connected to the common line 116. The pixel electrode 138 may include an extension portion 138a, a plurality of vertical portions 138b, and a horizontal portion 138c. The extension portion 138a may extend from the drain electrode 136. The vertical portions 138b may vertically extend from the extension portion 138a and may be spaced apart from each other. The horizontal portion 138c may be disposed over the common line 116 to electrically interconnect the vertical portions 138b. The common electrode 117 may include a plurality of vertical portions 117b and a horizontal portion 117a. The vertical portions 117b may vertically extend from the common line 116 and may be arranged in an alternating pattern with the vertical portions 138b of the pixel electrode 138. The horizontal portion 117a electrically interconnects the plurality of vertical portion 117b.

A first storage capacitor C1 and a second storage capacitor C2 may be formed within the pixel region. The first storage capacitor C1 may use a portion of the common line 116 as a first storage electrode and may use the horizontal portion 138c of the pixel electrode 138 as a second storage electrode. The second storage capacitor C2 may use a transparent electrode 152, which electrically contacts the horizontal portion 138c, as a first storage electrode and may use a portion of the gate line 112 as a second storage electrode. The gate pad electrode 113 may electrically contact a transparent gate pad terminal electrode 154, and the data pad electrodes 126a and 126b may electrically contact a transparent data pad terminal electrode 156. The source electrode 134, the drain electrode 136, the data lines 124a and 124b, and the data pad electrodes 126a and 126b may include one of aluminum (Al) and an aluminum alloy, such as aluminum neodymium (AlNd), thereby decreasing signal resistance. However, if the aluminum (Al) directly contacts an amorphous silicon layer, the aluminum (Al) may cause leakage of an electric current by a mutual diffusion phenomenon. In addition, if the aluminum (Al) contacts the transparent electrodes 152, 154 and 156, the aluminum (Al) may increase a contact resistance. Accordingly, the data lines 124a and 124b, the data pad electrodes 126a and 126b, the source and drain electrodes 134 and 136, and the horizontal portion 138c of the pixel electrode 138 may be formed as a dual-layer structure. A first metal layer of the dual-layer structure may include one of chromium (Cr), molybdenum (Mo), tungsten (W), tantalum (Ta) and titanium (Ti). A second metal layer of the dual-layer structure may include aluminum (Al). If the first metal layer is formed of metals other than molybdenum (Mo), the first metal layer and the second metal layer may be patterned during separate steps. However, if the first metal layer is formed of molybdenum (Mo), the first metal layer and the second metal layer may be simultaneously etched during a single step. The data line may include a first data line 124a and a second data line 124b. The data pad electrode may include a first data pad electrode 126a and a second data pad electrode 126b.

Figure 4A:
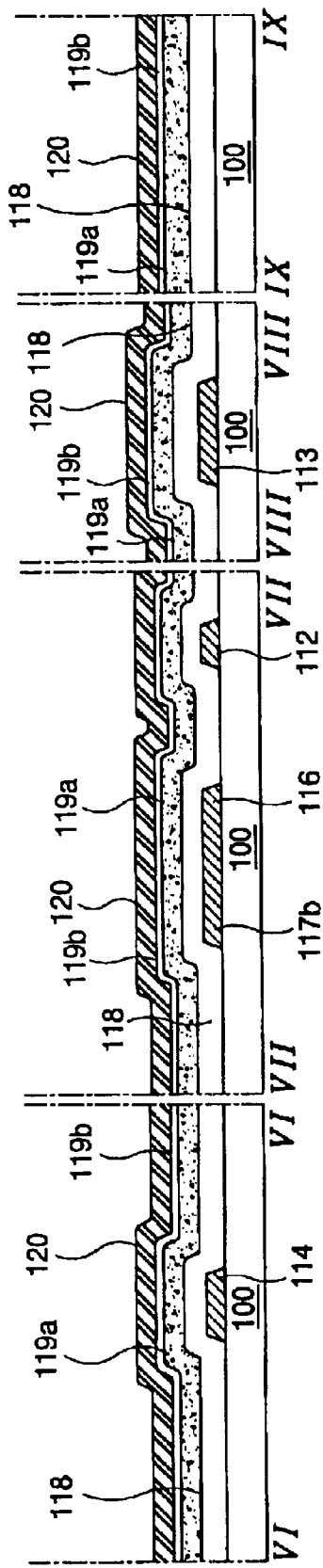
FIGS. 4A to 4E are cross-sectional views taken along VI—VI, VII—VII, VIII—VIII and IX—IX of FIG. 3 and illustrate an exemplary fabrication sequence of an array substrate according to the present invention.

FIGS. 4A to 4E are cross-sectional views taken along VI—VI, VII—VII, VIII—VIII and IX—IX of FIG. 3 and illustrate an exemplary fabrication method of an array substrate according to the present invention. In FIG. 4A, the gate line 112, the common line 116, and the common electrode 117 (in FIG. 3) may be formed on the substrate 100, wherein the gate electrode 114 may extend from the gate line 112. The common line 116 may be formed parallel to the gate line 112 and may be spaced apart from the gate line 112. The common electrode 117 may include a plurality of vertical portions 117b and a horizontal portion 117a (in FIG. 3). The vertical portions 117b may vertically extend from the common line 116, wherein the horizontal portion 117a (in FIG. 3) may electrically interconnect the vertical portions 117b. Then, a gate insulating layer 118 may be formed by depositing an inorganic insulating material, such as silicon nitride (SiNx) or silicon oxide ($SiO_2$), on the substrate 100. A first silicon layer 119a and a second silicon layer 119b may be respectively formed by depositing amorphous silicon (a-Si:H) and impurities doped amorphous silicon ($n^+$a-Si:H or $p^+$a-Si:H) on the gate insulating layer 118. A first metal layer 120 may be subsequently formed by depositing a conductive metal material, such as chromium (Cr), titanium (Ti), tantalum (Ta), tungsten (W), on the second silicon layer 119b.

Figure 4B:
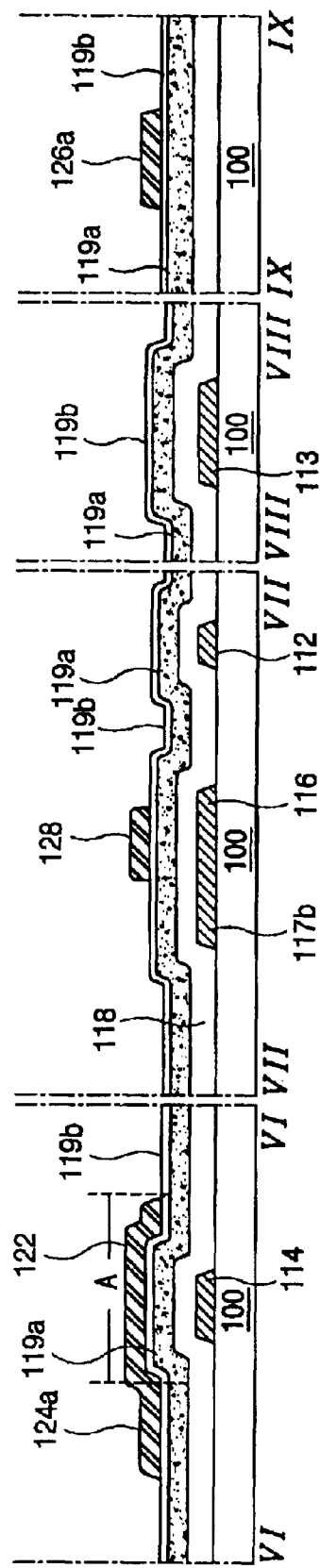

In FIG. 4B, a first metal pattern 122, the first data line 124a, the first data pad electrode 126a, and a metal island pattern 128 may be formed by wet etching the first metal layer 120. The first metal pattern 122 may be formed in a source and drain region "A." The first data line 124a may be formed to extend from the first metal pattern 122, and the first data pad electrode 126a may be formed to extend from the first data line 124a. The metal island pattern 128 may be formed over the common line 116.

Figure 4C:
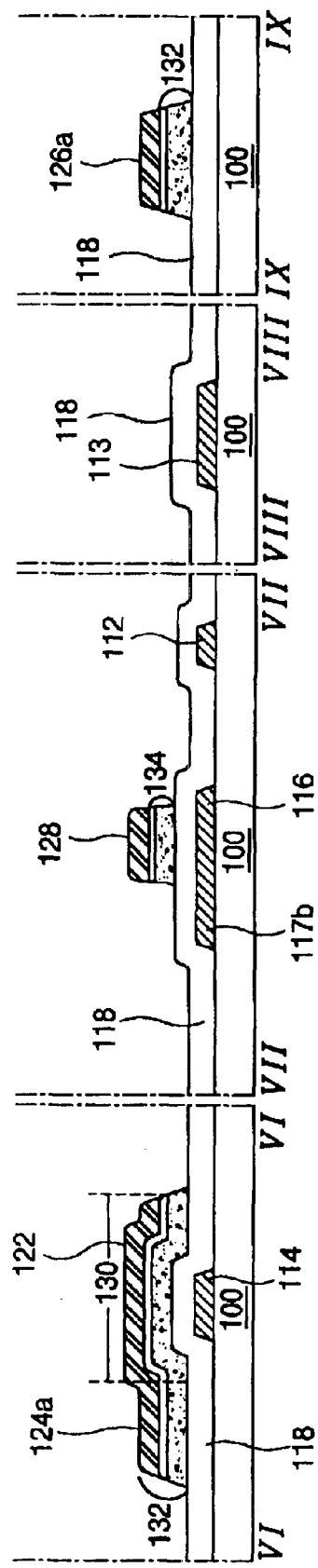

In FIG. 4C, a first semiconductor layer 130, a semiconductor line 132, and a second semiconductor layer 134 may be formed by dry etching the first and second silicon layers 119a and 119b. The first semiconductor layer 130 may be formed under the first metal pattern 122. The semiconductor line 132 may be formed to extend from under the first data line 124a and the first data pad electrode 126a. The second semiconductor layer 134 may be formed to extend from under the metal island pattern 128.

Figure 4D:
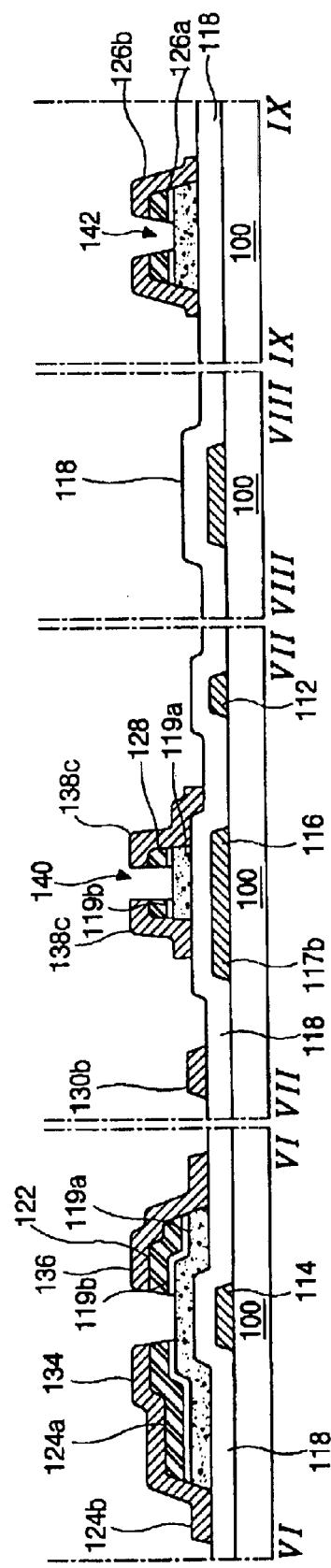

In FIG. 4D, the source electrode 134, the drain electrode 136, the second data line 124b, and the second data pad electrode 126b may be formed by depositing and patterning aluminum (Al) or aluminum alloy, such as aluminum neodymium (AlNd), on the substrate 100. The second data line 124b may be formed to extend from the source electrode 134, the second data pad electrode 126b may be formed to extend from the second data line 124b over the first data pad electrode 126a, and a pixel electrode 138 may be formed. The pixel electrode 138 may include the extension portion 138a (in FIG. 3), a plurality of vertical portions 138b, the horizontal portion 138c. The extension portion 138a (in FIG. 3) may be formed to extend from the drain electrode 136, and the vertical portions 138b may be formed to vertically extend from the extension portion 130a. The horizontal portion 138c may electrically interconnect the vertical portions 138b. A first storage contact hole 140 may be formed by etching a portion of the horizontal portion 138c of the pixel electrode 138, thereby exposing a side portion of the metal island pattern 128. A first data pad contact hole 142 may be formed by etching a portion of the second data pad electrode 126b, thereby exposing a side portion of the first data pad electrode 126a. Then, the second silicon layer 119b that is exposed between the source electrode 134 and the drain electrode 136 may be removed. Simultaneously, the second silicon layer 119b under the first storage contact hole 140 and the first data pad contact hole 142 may be removed.

Figure 4E:
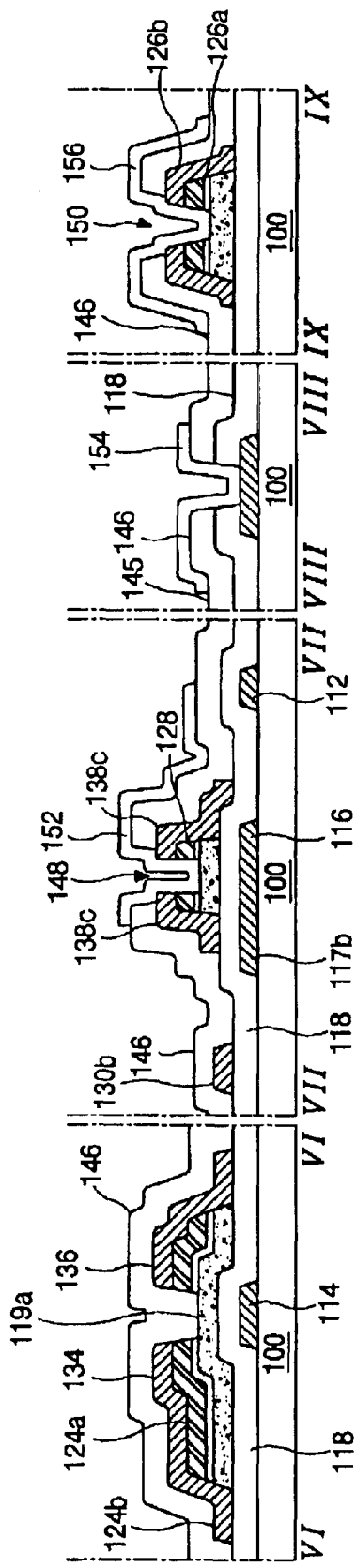

In FIG. 4E, a passivation layer 146 may be formed by coating an organic insulating material, such as benzocyclobutene (BCB) and an acrylic resin, on the substrate 100. The passivation layer 146 may alternatively be formed by depositing an inorganic insulating material, such as silicon nitride (SiNx) and silicon oxide ($SiO_2$), on the substrate 100. Then, a second storage contact hole 148 corresponding to the first storage contact hole 140 and a second data pad contact hole 150 corresponding to the first data pad contact hole 142 may be subsequently formed by patterning the passivation layer 146. A size of the second storage contact hole 148 may be bigger than the first storage contact hole 140 or may be the same as the first storage contact hole 140. A transparent electrode 152 may be formed on the passivation layer 146 corresponding to the second storage contact hole 148 by depositing and patterning a transparent conductive metal material, such as indium tin oxide (ITO) and indium zinc oxide (IZO). The transparent electrode 152 may electrically contact the horizontal portion 138c of the pixel electrode 138 and a side portion of the exposed metal island pattern 128. The transparent electrode 152 may be formed to extend over the gate line 112 adjacent to the common line 116. At the same time, the transparent gate pad terminal electrode 154, which contacts the gate pad electrode 113, and the transparent data pad terminal electrode 156, which contacts the first data pad electrode 126a and the second data pad electrode 126b, may be formed. Accordingly, in order to reduce a contact resistance, the transparent electrode directly contacts the first metal layer. Thus, the horizontal portion 138c and the second data pad electrode 126b are etched during formation of the first storage contact hole 140 and the first data pad contact hole 142. For example, aluminum (Al) has a relatively low electric resistance and is selected as a material for signal lines. However, when aluminum (Al) is exposed to air, it reacts with oxygen to produce aluminum oxide ($Al_2O_3$) that has a relatively high electric resistance. Accordingly, when the transparent electrode contacts the aluminum metal layer having the aluminum oxide ($Al_2O_3$), a very high contact resistance is generated that significantly limits the performance of a liquid crystal-display (LCD) device. Thus, according to the present invention, the transparent electrode directly contacts the first metal layer that is not easily oxidized.

Figure 5A:
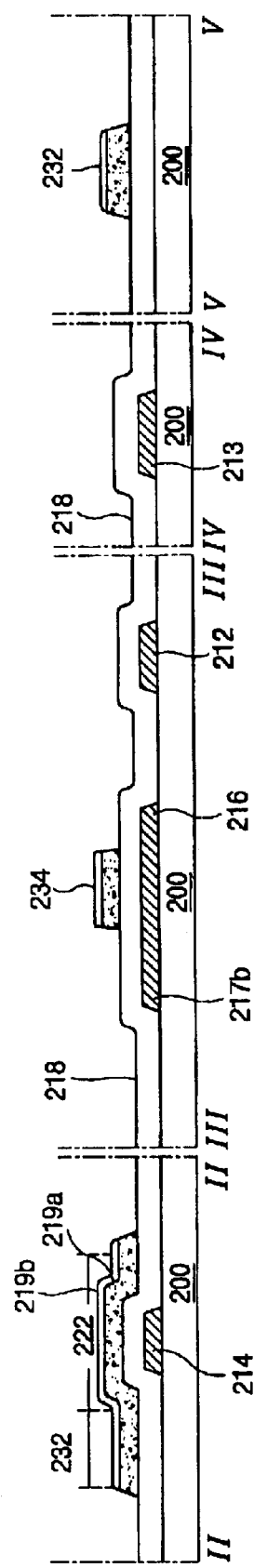
FIGS. 5A to 5D are cross-sectional views taken along VI—VI, VII—VII, VIII—VIII and IX—IX of FIG. 3 and illustrate another exemplary fabrication sequence of an array substrate according to the present invention.

FIGS. 5A to 5D are cross-sectional views taken along VI—VI, VII—VII, VIII—VIII and IX—IX of FIG. 3 and illustrate another exemplary fabrication method of an array substrate according to the present invention. In FIG. 5A, a gate line 212, a common line 216, and a common electrode 217 (corresponding to 117 in FIG. 3) may be formed on a substrate 200, and a gate electrode 214 may be formed to extend from the gate line 212. The common line 216 may be formed to be spaced apart from the gate line 212, and may include a plurality of vertical portions 217b (corresponding to 117b in FIG. 3) and a horizontal portion 217a (corresponding to 117a in FIG. 3). The vertical portions 217b may be formed to vertically extend from the common line 216, and the horizontal portion 217a may be formed to electrically interconnect the vertical portions 217b. Then, a gate insulating layer 218 may be formed by depositing an inorganic insulating material, such as silicon nitride (SiNx) and silicon oxide ($SiO_2$), on the substrate 200. A first silicon layer 219a and a second silicon layer 219b may be subsequently formed by depositing amorphous silicon (a-Si:H) and impurities doped amorphous silicon ($n^+$a-Si:H or $p^+$a-Si:H) on the gate insulating layer 218, respectively. A first semiconductor layer 222, a semiconductor line 232, and a second semiconductor layer 234 may be formed by patterning the first silicon layer 219a and the second silicon layer 219b. The first semiconductor layer 222 may be formed in an active layer region. The semiconductor line 232 may be formed to extend from the first semiconductor layer 222 to a data pad region. The second semiconductor layer 234 may be formed over the common line 216. The first silicon layer 219a of the first semiconductor layer 222 may be referred to as an active layer, and the second silicon layer 219b of the first semiconductor layer 222 may be referred to as an ohmic contact layer.

Figure 5B:
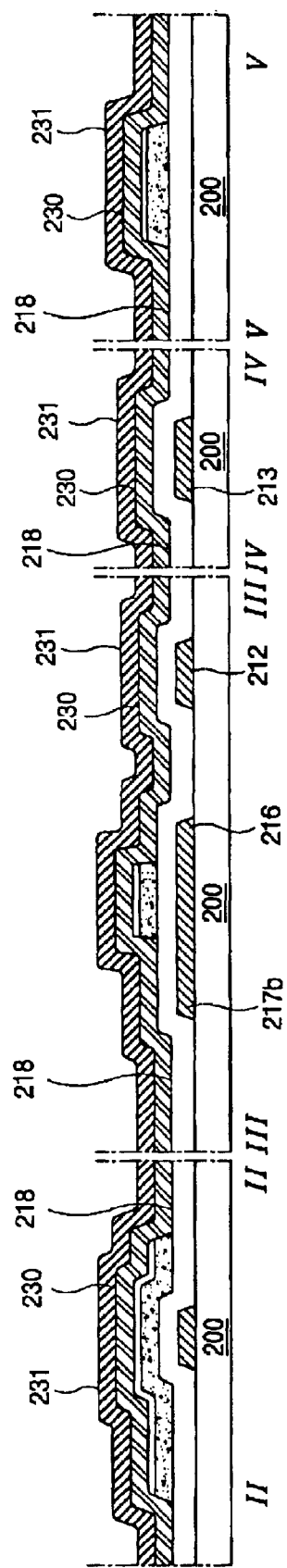

In FIG. 5B, a first metal layer 230 and a second metal layer 231 may be simultaneously formed on the substrate 200. The first metal layer 230 may be formed by depositing molybdenum (Mo), and the second metal layer 231 may be formed by depositing aluminum (Al) or an aluminum alloy.

Figure 5C:
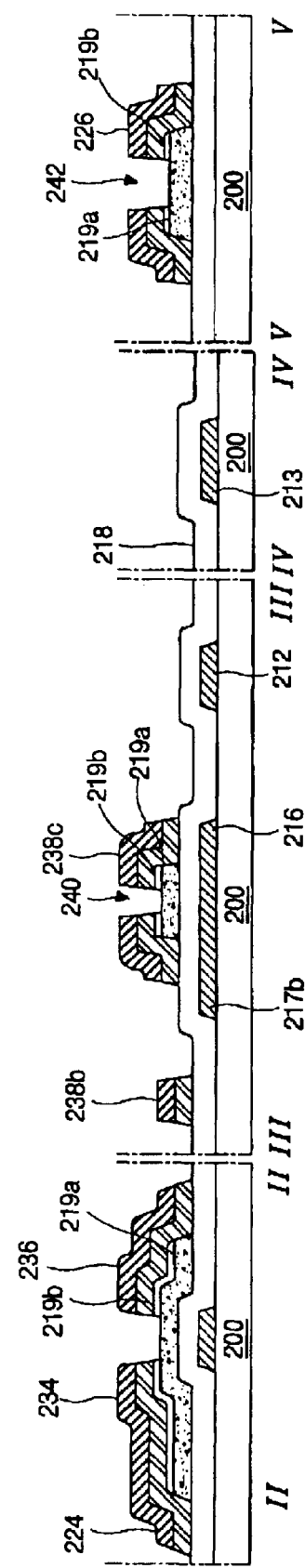

In FIG. 5C, a source electrode 234, a drain electrode 236, a data line 234, and a data pad electrode 226 may be simultaneously formed by wet etching the first metal layer 230 and the second metal layer 231. In addition, a pixel electrode 238 (not shown but corresponding to 138 in FIG. 3) may be formed at the same time. The pixel electrode 238 may be formed to include an extension portion 238a (not shown but corresponding to 138a in FIG. 3), a plurality of vertical portions 238b, and a horizontal portion 238c. The extension portion 238a (refer to 138a in FIG. 3) may be formed to extend from the drain electrode 236. The vertical portions 238b may be formed to vertically extend from the extension portion 238a. The horizontal portion 238c may electrically interconnect the plurality of vertical portions 238b and may be disposed over the common line 216. Then, a first storage contact hole 240 may be formed by etching a portion of the horizontal portion 238c, and a first data pad contact hole 242 may be formed by etching a portion of the data pad electrode 226. Accordingly, a portion of the second silicon layer 219b may be exposed through a region between the source and drain electrodes 234 and 236, the first storage contact hole 240, and the first data pad contact hole 242. The exposed portion of the second silicon layer 219b may be etched away by dry etching using a photoresist, which may be retained during a previous etching process for forming contact holes, as an etch stopper.

Figure 5D:
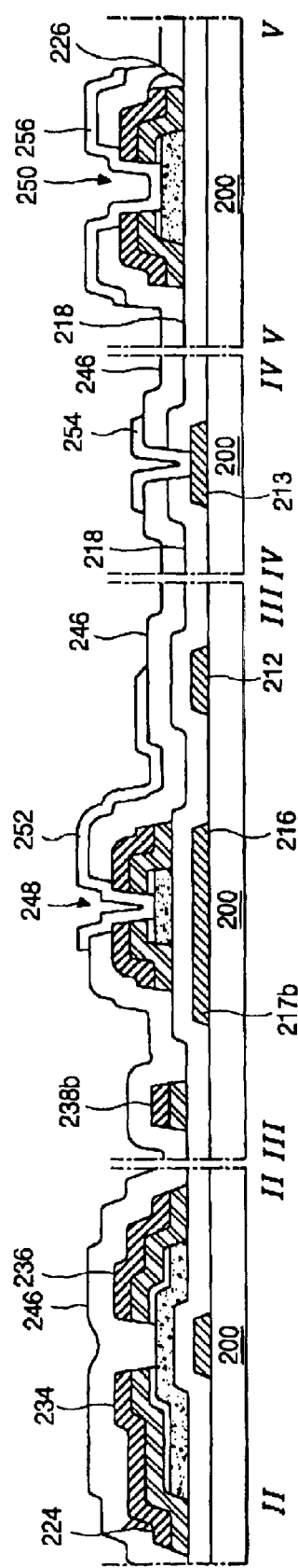

In FIG. 5D, a passivation layer 246 may be formed by coating an organic insulating material, such as benzocyclobutene (BCB) and an acrylic resin, on the substrate 200. The passivation layer 246 may alternatively be formed by depositing an inorganic insulating material, such as silicon nitride (SiNx) and silicon oxide ($SiO_2$), on the substrate 200. A second storage contact hole 248 and a second data pad contact hole 250 may be subsequently formed by pattering the passivation layer 246. The second storage contact hole 248 corresponds to the first storage contact hole 240 and the second data pad electrode 250 corresponds to the first data pad contact hole 242. Then, a transparent electrode 252 may be subsequently formed on the passivation layer 246 by depositing and patterning a transparent conductive metal material, such as indium tin oxide (ITO) and indium zinc oxide (IZO). The transparent electrode 252 may electrically contact the horizontal portion 238c (in FIG. 5C) of the pixel electrode, and may be formed to extend over the gate line 212 adjacent to the common line 216. Simultaneously, a transparent gate pad terminal electrode 254 and a data pad terminal electrode 256 may be formed. The gate pad terminal electrode 254 may electrically contact the gate pad electrode 213, and the data pad terminal electrode 256 may electrically contact the data pad electrode 226. Accordingly, the source and drain electrodes and data lines may be formed to have a relatively low electric resistance for manufacturing large-scaled liquid crystal display panels.

It will be apparent to those skilled in the art that various modifications and variations can be made in the array substrate for an IPS mode liquid crystal display device and fabricating method for the same of the present invention without departing from the spirit or scope of the invention. Thus, it is intended that the present invention cover the modifications and variations of this invention provided they come within the scope of the appended claims and their equivalents.

What is claimed is:

1. An array substrate for qn in-plane switching (IPS) mode liquid crystal display (LCD) device, comprising:
a substrate;
a plurality of gate lines disposed along a first direction on the substrate;
a plurality of data lines disposed along a second direction perpendicular to the first direction on the substrate to define a plurality of pixel regions;
a pixel electrode and a common electrode on the substrate, the pixel electrode including an extension portion, a plurality of vertical portions, and a horizontal portion; and
a transparent electrode contacting the horizontal portion of the pixel electrode and extending over one of the gate lines,
wherein the data line includes aluminum dual layer structure having a first metal layer and a second metal layer.

2. The array substrate according to claim 1, further including a metal pattern beneath the horizontal portion of the pixel electrode.

3. The array substrate according to claim 2, wherein the metal pattern includes at least one of chromium (Cr), molybdenum (Mo), tungsten (W), tantalum (Ta) and titanium (Ti).

4. The array substrate according to claim 1, wherein the first metal layer of the data line includes at least one of chromium (Cr), tungsten (W), tantalum (Ta) and titanium (Ti), and the second metal layer includes at least one of aluminum (Al) and an aluminum alloy.

5. The array substrate according to claim 1, wherein the first metal layer of the data line includes at least molybdenum (Mo).

6. The array substrate according to claim 1, wherein the pixel electrode includes a dual-layer structure having a first metal layer and a second metal layer.

7. The array substrate according to claim 6, wherein the first metal layer of the pixel electrode includes at least molybdenum (Mo), and the second metal layer of the pixel electrode includes at least one of aluminum (Al) and an aluminum alloy.

8. An array substrate for an in-plane switching (IPS) mode liquid crystal display (LCD) device, comprising:
a substrate;
a plurality of gate lines, a plurality of common lines, and a gate pad electrode on the substrate, the gate pad electrode extending from the gate lines;
a plurality of data lines and a data pad electrode extending from the data lines;
source and drain electrodes on the substrate;
a pixel electrode and a common electrode on the substrate, the pixel electrode including an extension portion, a plurality of vertical portions, and a horizontal portion; and
a transparent electrode, a gate pad terminal electrode, and a data pad terminal electrode, the transparent electrode contacting the pixel electrode and extending over the gate lines, the gate pad terminal electrode contacting the gate pad electrode, and the data pad terminal electrode contacting the data pad electrode,
wherein the data lines, the data pad, and the source and drain electrodes include an aluminum dual-layer structure having a first metal layer and a second metal layer.

9. The array substrate according to claim 8, further including a metal pattern beneath the horizontal portion of the pixel electrode.

10. The array substrate according to claim 9, wherein the metal pattern includes at least one of chromium (Cr), molybdenum (Mo), tungsten (W), tantalum (Ta) and titanium (Ti).

11. The array substrate according to claim 8, wherein the first metal layer of the data line, the data pad electrode, and the source and drain electrodes include at least one of chromium (Cr), tungsten (W), tantalum (Ta), and titanium (Ti), and the second metal layer includes at least one of aluminum (Al) and an aluminum alloy.

12. The array substrate according to claim 8, wherein the first metal layer of the data line, the data pad electrode, and the source and drain electrodes include at least molybdenum (Mo).

13. The array substrate according to claim 8, wherein the pixel electrode includes a dual-layer structure having a first metal layer and a second metal layer.

14. The array substrate according to claim 13, wherein the first metal layer of the pixel electrode includes at least molybdenum (Mo), and the second metal layer of the pixel electrode includes at least one of aluminum (Al) and an aluminum alloy.

15. A method for fabricating an array substrate for an in-plane switching (IPS) mode liquid crystal display (LCD) device, comprising:
forming a plurality of gate lines on a substrate;
forming a plurality of data lines crossing the gate lines, the data lines including an aluminum dual-layer structure having a first metal layer and a second metal layer;
forming a pixel electrode and a common electrode on the substrate, the pixel electrode having an extension portion, a plurality of vertical portions, and a horizontal portion; and
forming a transparent electrode contacting the horizontal portion of the pixel electrode and extending over the gate lines.

16. The method according to claim 15, further comprising forming a metal pattern beneath the horizontal portion of the pixel electrode.

17. The method according to claim 16, wherein the metal pattern includes at least one of chromium (Cr), molybdenum (Mo), tungsten (W), tantalum (Ta), and titanium (Ti).

18. The method according to claim 15, wherein the first metal layer of the data lines includes at least one of chromium (Cr), tungsten (W), tantalum (Ta), and titanium (Ti), and the second metal layer includes at least one of aluminum (Al) and an aluminum alloy.

19. The method according to claim 15, wherein the first metal layer of the data lines includes at least molybdenum (Mo).

20. The method according to claim 15, wherein the pixel electrode includes a dual-layer structure having a first metal layer and a second metal layer.

21. The method according to claim 20, wherein the first metal layer of the pixel electrode includes at least molybdenum (Mo), and the second metal layer of the pixel electrode includes at least one of aluminum (Al) and an aluminum alloy.

22. A method for fabricating an array substrate for an in-plane switching (IPS) mode liquid crystal display (LCD) device, comprising:
forming a plurality of gate lines, a plurality of common lines, and a gate pad electrode on a substrate, the gate pad electrode extending from the gate lines;
forming a plurality of data lines and a data pad electrode, the data lines and the data pad electrode including an aluminum dual-layer structure having a first metal layer and a second metal layer, the data pad electrode extending from the data lines;
forming a pixel electrode and a common electrode on the substrate, the pixel electrode having an extension portion, a plurality of vertical portions, and a horizontal portion; and
forming a transparent electrode, a gate pad terminal electrode, and a data pad terminal electrode,
wherein the transparent electrode contacts the horizontal portion of the pixel electrode and extends over the gate lines, the gate pad terminal electrode contacts the gate pad electrode, and the data pad terminal electrode contacts the data pad electrode.

23. The method according to claim 22, further comprising forming a metal pattern beneath the horizontal portion of the pixel electrode.

24. The method according to claim 23, wherein the metal pattern includes at least one of chromium (Cr), molybdenum (Mo), tungsten (W), tantalum (Ta), and titanium (Ti).

25. The method according to claim 22, wherein the first metal layer of the data lines and the data pad electrode include at least one of chromium (Cr), tungsten (W), tantalum (Ta), and titanium (Ti), and the second metal layer includes at least one of aluminum (Al) and an aluminum alloy.

26. The method according to claim 22, wherein the first metal layer of the data lines and the data pad electrode include at least molybdenum (Mo).

27. The method according to claim 22, wherein the pixel electrode includes a dual-layer structure having a first metal layer and a second metal layer.

28. The method according to claim 27, wherein the first metal layer of the pixel electrode includes at least molybdenum (Mo), and the second metal layer of the pixel electrode includes at least one of aluminum (Al) and an aluminum alloy.

29. The method according to claim 22, wherein the transparent electrode and the data pad terminal electrode contacts the horizontal portion of the pixel electrode and the data pad electrode through a first contact hole and a second contact hole.

30. The method according to claim 29, wherein the first contact hole is formed by etching a portion of the horizontal portion of the pixel electrode and data pad electrode, and the second contact hole is formed by etching the passivation layer corresponding to the first contact hole.

31. The method according to claim 30, wherein the gate pad terminal electrode contacts the gate pad electrode through a third hole formed by etching the passivation layer over the gate pad electrode.

32. A method for fabricating an array substrate for an in-plane switching (IPS) mode liquid crystal display (LCD) device, comprising:
forming a plurality of gate lines, a plurality of common lines, and a gate pad electrode on a substrate, the gate pad electrode extending from the gate lines;
forming a plurality of data lines and a data pad electrode on the substrate, the data lines and the data pad electrode including an aluminum dual-layer structure having a first metal layer and a second metal layer, and the data pad electrode extending from the data lines;
forming source and drain electrodes on the substrate, the source and drain electrodes including an aluminum dual-layer structure having a first metal layer and a second metal layer;
forming a pixel electrode and a common electrode on the substrate, the pixel electrode having an extension portion, a plurality of vertical portions, and a horizontal portion; and
forming a transparent electrode, a gate pad terminal electrode, and a data pad terminal electrode,
wherein the transparent electrode contacts the horizontal portion of the pixel electrode and extends over the gate lines, the gate pad terminal electrode contacts the gate pad electrode, and the data pad terminal electrode contacts the data pad electrode.

33. The method according to claim 32, further comprising forming a metal pattern beneath the horizontal portion of the pixel electrode.

34. The method according to claim 33, wherein the metal pattern includes at least one of chromium (Cr), molybdenum (Mo), tungsten (W), tantalum (Ta), and titanium (Ti).

35. The method according to claim 32, wherein the first metal layer of the data lines, the data pad electrode, and the source and drain electrodes include at least one of chromium (Cr), tungsten (W), tantalum (Ta), and titanium (Ti), and the second metal layer includes at least one of aluminum (Al) and an aluminum alloy.

36. The method according to claim 32, wherein the first metal layer of the data lines, the data pad electrode, and the source and drain electrodes include at least molybdenum (Mo).

37. The method according to claim 32, wherein the pixel electrode includes a dual-layer structure having a first metal layer and a second metal layer.

38. The method according to claim 37, wherein the first metal layer of the pixel electrode includes at least molybdenum (Mo), and the second metal layer of the pixel electrode includes at least one of aluminum (Al) and an aluminum alloy.

* * * * *